(12) United States Patent
Ueno et al.

(10) Patent No.: US 9,718,612 B2
(45) Date of Patent: Aug. 1, 2017

(54) REFRIGERATION DEVICE FOR CONTAINER

(71) Applicant: DAIKIN INDUSTRIES, LTD., Osaka-shi, Osaka (JP)

(72) Inventors: Akitoshi Ueno, Osaka (JP); Yuusuke Fujimoto, Osaka (JP); Hideaki Kuriyama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 196 days.

(21) Appl. No.: 14/417,428

(22) PCT Filed: Jul. 23, 2013

(86) PCT No.: PCT/JP2013/004467
§ 371 (c)(1),
(2) Date: Jan. 26, 2015

(87) PCT Pub. No.: WO2014/020856
PCT Pub. Date: Feb. 6, 2014

(65) Prior Publication Data
US 2015/0191305 A1    Jul. 9, 2015

(30) Foreign Application Priority Data

Jul. 31, 2012  (JP) .................................. 2012-170291

(51) Int. Cl.
*F25B 29/00*   (2006.01)
*B65D 88/74*   (2006.01)
(Continued)

(52) U.S. Cl.
CPC ......... *B65D 88/747* (2013.01); *B65D 88/744* (2013.01); *B65D 88/745* (2013.01);
(Continued)

(58) Field of Classification Search
CPC .... B65D 88/747; F25B 41/003; F25B 41/043; F25B 2700/2104; F25B 6/02
See application file for complete search history.

(56) References Cited

U.S. PATENT DOCUMENTS 6,035,653 A * 3/2000 Itoh .................... B60H 1/00878
62/176.5

FOREIGN PATENT DOCUMENTS

EP    1 801 520 A1    6/2007
EP    1 923 646 A1    5/2008
(Continued)

OTHER PUBLICATIONS

Satoru et al., Refrigerator for Refrigerated Container, Mar. 5, 1999, JPH1163769A, Whole Document.*

*Primary Examiner* — Larry Furdge
(74) *Attorney, Agent, or Firm* — Birch, Stewart, Kolasch & Birch, LLP

(57) ABSTRACT

A container refrigeration device aims to prevent low temperature damage to freight in a container. The container refrigeration device includes: a temperature controlling section (101) configured to perform, in a switchable manner, first temperature control under which a temperature inside the container (C) is controlled based on a blown air temperature (Tss) and second temperature control under which the temperature inside the container (C) is controlled based on a suction air temperature (Trs) during dehumidification operation; and a control switching section (103) configured to switch the first temperature control to the second temperature control when the blown air temperature (Tss) is higher than the suction air temperature (Trs) during the dehumidification operation in which part of a refrigerant discharged from a compressor (30) is allowed to flow into a reheat heat exchanger (83).

5 Claims, 9 Drawing Sheets

(51) Int. Cl.
*F25D 11/00* (2006.01)
*F25D 17/04* (2006.01)
*F25B 41/00* (2006.01)
*F25B 41/04* (2006.01)
*F25B 49/02* (2006.01)
*F25B 6/02* (2006.01)

(52) U.S. Cl.
CPC .......... *F25B 41/003* (2013.01); *F25B 41/043* (2013.01); *F25B 49/02* (2013.01); *F25D 11/003* (2013.01); *F25D 17/042* (2013.01); *F25B 6/02* (2013.01); *F25B 2400/13* (2013.01); *F25B 2600/0253* (2013.01); *F25B 2600/2515* (2013.01); *F25B 2700/1931* (2013.01); *F25B 2700/1933* (2013.01); *F25B 2700/2104* (2013.01); *F25B 2700/2106* (2013.01); *F25B 2700/21151* (2013.01); *F25B 2700/21152* (2013.01); *F25D 2317/04111* (2013.01); *Y02B 30/741* (2013.01); *Y02B 40/32* (2013.01)

(56) References Cited

FOREIGN PATENT DOCUMENTS

| | | | |
|---|---|---|---|
| JP | 62-284167 A | | 12/1987 |
| JP | 11-63769 A | | 3/1999 |
| JP | H1163769 A | * | 3/1999 |
| JP | 2001-208398 A | | 8/2001 |
| JP | 2003-90660 A | | 3/2003 |

* cited by examiner

FIG.6

| | FIRST DEHUMIDIFICATION CONTROL | SECOND DEHUMIDIFICATION CONTROL | THIRD DEHUMIDIFICATION CONTROL |
|---|---|---|---|
| COMPRESSOR (INV) | Inverter Frequency under Control | Inverter Frequency under Control | PI Control |
| MAIN EV | Main Expansion Valve under Control (SH Control of Evaporator) | Main Expansion Valve under Control (SH Control of Evaporator) | Main Expansion Valve under Control Control of Superheat Degree $\alpha$ ($\alpha$=1 to 12) |
| CF | Start/Stop High-pressure Control | Start/Stop $\beta$ Control($\beta$=1 to 9) | Start/Stop $\beta$ Control($\beta$=Max) |
| ESV | OFF | OFF | OFF |
| INTERMEDIATE EV | OFF | OFF | OFF |
| HSV | OFF | OFF | OFF |
| RSV | ON | ON | ON |
| DMV | 760pls | 760pls | 760pls |

REFRIGERATION DEVICE FOR CONTAINER

TECHNICAL FIELD

The present invention relates to a container refrigeration device (a refrigeration device for container), and in particular, to control of temperature inside the container during dehumidifying operation.

BACKGROUND ART

Container refrigeration devices have conventionally been used to cool the inside of containers for use in, e.g., marine transportation.

The container refrigeration device described in Patent Document 1 includes a refrigerant circuit including a compressor, a condenser, a receiver, an electronic expansion valve, and an evaporator which are sequentially connected together. The refrigerant circuit further includes a heat exchanger for heating which is located on the leeward side of the evaporator. The heat exchanger is configured to allow a gaseous refrigerant discharged by the compressor to flow therethrough. The container refrigeration device performs dehumidifying operation during which air having been cooled and dehumidified in the evaporator (i.e., blown air) is heated by the heat exchanger for heating.

CITATION LIST

Patent Document

PATENT DOCUMENT 1: Japanese Unexamined Patent Publication No. H11-63769

SUMMARY OF THE INVENTION

Technical Problem

In the container refrigeration device as described above, blown air is supplied to the inside of the container through an air outlet extending in the container width direction. A temperature sensor provided at a point of the air outlet detects the temperature of the blown air, and the temperature inside the container is controlled based on the detected temperature.

However, during the dehumidifying operation, since the blown air having been blown out of the evaporator is heated by the heat exchanger for heating, the blown air becomes non-uniform in temperature in the container width direction. Specifically, even when the temperature detected by the temperature sensor is close to the temperature inside the container, the blown air may have an average temperature lower than the temperature detected by the temperature sensor. In such a case, under temperature control based on the temperature detected by the temperature sensor, air having an average temperature lower than the temperature detected by the temperature sensor is blown out, thereby causing low temperature damage to the freight.

It is therefore an object of the present invention to prevent low temperature damage to freight in a container.

Solution to the Problem

A first aspect of the present invention relates to a container refrigeration device including: a refrigerant circuit (20) including a compressor (30), a condenser (31), an expansion mechanism (32), and an evaporator (33) sequentially connected together; and a reheat heat exchanger (83) configure to allow part of a refrigerant discharged from the compressor (30) to directly flow into the reheat heat exchanger (83), the device configured to perform dehumidification operation during which air sucked from an inside of a container (C) and subjected to cooling dehumidification in the evaporator (33) exchanges heat with the refrigerant flowing through the reheat heat exchanger (83), wherein the device further includes a suction air temperature detector (70) configured to detect a suction air temperature (Trs) which is a temperature of air being sucked into the evaporator (33) from the inside of the container (C), a blown air temperature detector (71) configured to detect a blown air temperature (Tss) which is a temperature of air having passed through the reheat heat exchanger (83) and being blown into the inside of the container (C), a temperature controlling section (101) configured to perform, during the dehumidification operation, first temperature control under which a temperature inside the container (C) is controlled based on the blown air temperature (Tss) and second temperature control under which the temperature inside the container (C) is controlled based on the suction air temperature (Trs) in a switchable manner, and a control switching section (103) configured to switch from the first temperature control to the second temperature control when the blown air temperature (Tss) is higher than the suction air temperature (Trs) during the dehumidification operation during which the part of the refrigerant discharged from the compressor (30) is allowed to flow into the reheat heat exchanger (83).

According to the first aspect, in the refrigerant circuit (20), the refrigerant discharged from the compressor (30) condenses in the condenser (31). Thereafter, the refrigerant expands in the expansion mechanism (32), and evaporates in the evaporator (33). In the evaporator (33), the refrigerant flowing through the evaporator (33) exchange heat with the inside air of the container (C), and accordingly, the inside air is cooled. The suction air temperature detector (70) detects the temperature of air being sucked into the evaporator (33) (the suction air temperature (Trs)). The blown air temperature detector (71) detects the temperature of air being blown out from the reheat heat exchanger (83) (the blown air temperature (Tss)).

During the dehumidification operation, the air subjected to the cooling dehumidification in the evaporator (33) exchanges heat with the part of the refrigerant discharged from the compressor (30) and is heated in the reheat heat exchanger (83). When the suction air temperature (Trs) is higher than the blown air temperature (Tss) during the dehumidification operation, the control switching section (103) causes the temperature controlling section (101) to perform the first temperature control. Under the first temperature control, the temperature controlling section (101) controls the temperature inside the container (C) based on the blown air temperature (Tss) detected by the blown air temperature detector (71). When the blown air temperature (Tss) is higher than the suction air temperature (Trs) during the dehumidification operation, the control switching section (103) switches the temperature controlling section (101) from first temperature control to the second temperature control. Under the second temperature control, the temperature controlling section (101) controls the inside temperature of the container (C) based on the suction air temperature (Trs) detected by the suction air temperature detector (70).

A second aspect of the present invention relates to the container refrigeration device of the first aspect, wherein under the first temperature control, a target value of the blown air temperature (Tss) is set to a predetermined first target temperature (Tsp), and the device further includes a temperature setting section (104) configured to set a target value of the suction air temperature (Trs) to a second target temperature (Tsp') obtained by adding a correction value X to the predetermined first target temperature (Tsp).

According to the second aspect of the present invention, under the first temperature control, the target value of the blown air temperature (Tss) is set to the predetermined first target temperature. Under the first temperature control, the temperature controlling section (101) controls the temperature inside the container (C) such that the blown air temperature (Tss) becomes equal to the first target temperature. Under the second temperature control, the target value of the suction air temperature (Trs) is set to the second target temperature (Tsp') obtained by adding the correction value X to the first target temperature (Tsp). Under the second temperature control, the temperature controlling section (101) controls the temperature inside the container (C) such that the suction air temperature (Trs) becomes equal to the second target temperature (Tsp').

A third aspect of the invention relates to the container refrigeration device of the second aspect, wherein the temperature setting section (104) is configured to set the correction value X to a predetermined fixed value.

According to the third aspect of the present invention, under the second temperature control, the target value of the suction air temperature (Trs) is set to the second target temperature (Tsp') obtained by adding the correction value X to the first target temperature (Tsp). The correction value X is set to the predetermined fixed value. Under the second temperature control, the temperature controlling section (101) controls the temperature inside the container (C) such that the suction air temperature (Trs) becomes equal to the second target temperature (Tsp').

A fourth aspect of the present invention relates to the container refrigeration device of the second aspect of the invention, which further includes an outside air temperature detector (69) configured to detect an outside air temperature (Tout) which is a temperature of air outside the container (C), wherein the temperature setting section (104) is configured to calculate the correction value X based on the outside air temperature (Tout) and the first target temperature (Tsp).

According to the fourth aspect of the invention, the outside air temperature detector (69) detects the outside air temperature (Tout). The target value of the suction air temperature (Trs) is set to the second target temperature (Tsp') obtained by adding the correction value X to the first target value (Tsp). The correction value X is calculated based on the outside air temperature (Tout) and the first target temperature (Tsp). Under the second temperature control, the temperature controlling section (101) controls the temperature inside the container (C) such that the suction air temperature (Trs) becomes equal to the second target temperature (Tsp').

A fifth aspect of the present invention relates to the container refrigeration device of the second aspect of the invention, wherein the temperature setting section (104) is configured to calculate the correction value X based on a difference between the blown air temperature (Tss) detected before starting of the dehumidification operation during which the refrigerant discharged from the compressor (30) is allowed to flow into the reheat heat exchanger (83) and the suction air temperature (Trs) detected after the starting of the dehumidification operation.

According to the fifth aspect of the invention, under the second temperature control, the target value of the suction air temperature (Trs) is set to the second target temperature (Tsp') obtained by adding the correction value X to the first target temperature (Tsp). The correction value X is calculated based on the difference between the blown air temperature (Tss) detected before starting the dehumidification operation during which the refrigerant discharged from the compressor (30) is allowed to flow into the reheat heat exchanger (83) and the suction air temperature (Trs) detected after starting the dehumidification operation. Under the second temperature control, the temperature controlling section (101) controls the temperature inside the container (C) such that the suction air temperature (Trs) becomes equal to the second target temperature (Tsp').

Advantages of the Invention

According to the first aspect of the invention, when the blown air temperature (Tss) becomes higher than the suction air temperature (Trs) during the dehumidification operation, switching to the second temperature control under which the temperature inside the container (C) is controlled based on the suction air temperature (Trs) is carried out. Here, during the dehumidification operation, when the blown air temperature becomes higher than the suction air temperature in the container, it is conceivable that the blown air has non-uniformity in temperature due to influence of the reheat heat exchanger. Therefore, if temperature control was performed to cause the blown air temperature to become equal to the target value of the temperature inside of the container, the temperature inside the container could excessively decrease and low temperature damage could occur to the freight. On the other hand, according to the first aspect of the invention, the temperature inside the container (C) is controlled based on the temperature of air which has been sufficiently agitated in the container (C), has relatively low non-uniformity in temperature, and is being sucked into the evaporator (33) (i.e., the suction air temperature (Trs)). It is thus possible to prevent the temperature inside the container (C) from decreasing excessively. As a result, it is possible to prevent reliably low temperature damage from occurring to the freight in the container (C).

According to the second aspect of the invention, under the second temperature control, the target value of the suction air temperature (Trs) is set to the second target temperature (Tsp') that is higher than the first target temperature (Tsp). Here, the temperature of air being blown into the inside of the container (C) is ordinarily lower than the temperature of air being sucked from the inside of the container (C). Therefore, if the temperature of air being sucked from the inside of the container (C) (i.e., the suction air temperature (Trs)) was controlled based on the target value of the temperature of air being blown into the inside of the container (C) (i.e., the blown air temperature (Tss)), the temperature inside the container (C) could decrease excessively and low temperature damage could occur to the freight. According to the second aspect of the present invention, under the second temperature control, the target value of the suction sir temperature (Trs) is set to the second target temperature (Tsp') obtained by adding the correction value X to the first target temperature (Tsp). It is thus possible to prevent reliably the temperature inside the container (C) from decreasing excessively. As a result, it is possible to prevent reliably low temperature damage from occurring to the freight in the container (C).

According to the third aspect of the invention, under the second temperature control, the target value of the suction air temperature (Trs) is set to the second target temperature (Tsp') obtained by adding the fixed value to the first target temperature (Tsp). It is thus possible to prevent reliably the temperature inside the container (C) from decreasing excessively. As a result, it is possible to prevent reliably low temperature damage from occurring to the freight in the container (C).

According to the fourth aspect of the invention, under the second temperature control, the target value of the suction air temperature (Trs) is set to the second target temperature (Tsp') obtained by adding, to the first target temperature (Tsp), the correction value X calculated based on the outside air temperature (Tout) and the first target temperature (Tsp). It is thus possible to prevent reliably the temperature inside the container (C) from decreasing excessively. As a result, it is possible to prevent reliably low temperature damage from occurring to the freight in the container (C).

According to the fifth aspect of the invention, under the second temperature control, the target value of the suction air temperature (Trs) is set to the second target temperature (Tsp') obtained by adding, to the first target temperature (Tsp), the correction value X calculated based on the difference between the blown air temperature (Tss) detected before starting of the dehumidification operation during which the refrigerant discharged from the compressor (30) is allowed to flow into the reheat heat exchanger (83) and the suction air temperature (Trs) detected after the starting of the dehumidification operation. It is thus possible to prevent reliably the temperature inside the container (C) from decreasing excessively. As a result, it is possible to prevent reliably low temperature damage from occurring to the freight in the container (C).

BRIEF DESCRIPTION OF THE DRAWINGS

FIG. 6 is a table showing a dehumidification control state according to the first embodiment.

DESCRIPTION OF EMBODIMENTS

Embodiments of the present invention will be described below in detail with reference to the drawings.

First Embodiment of the Invention

Figure 1:
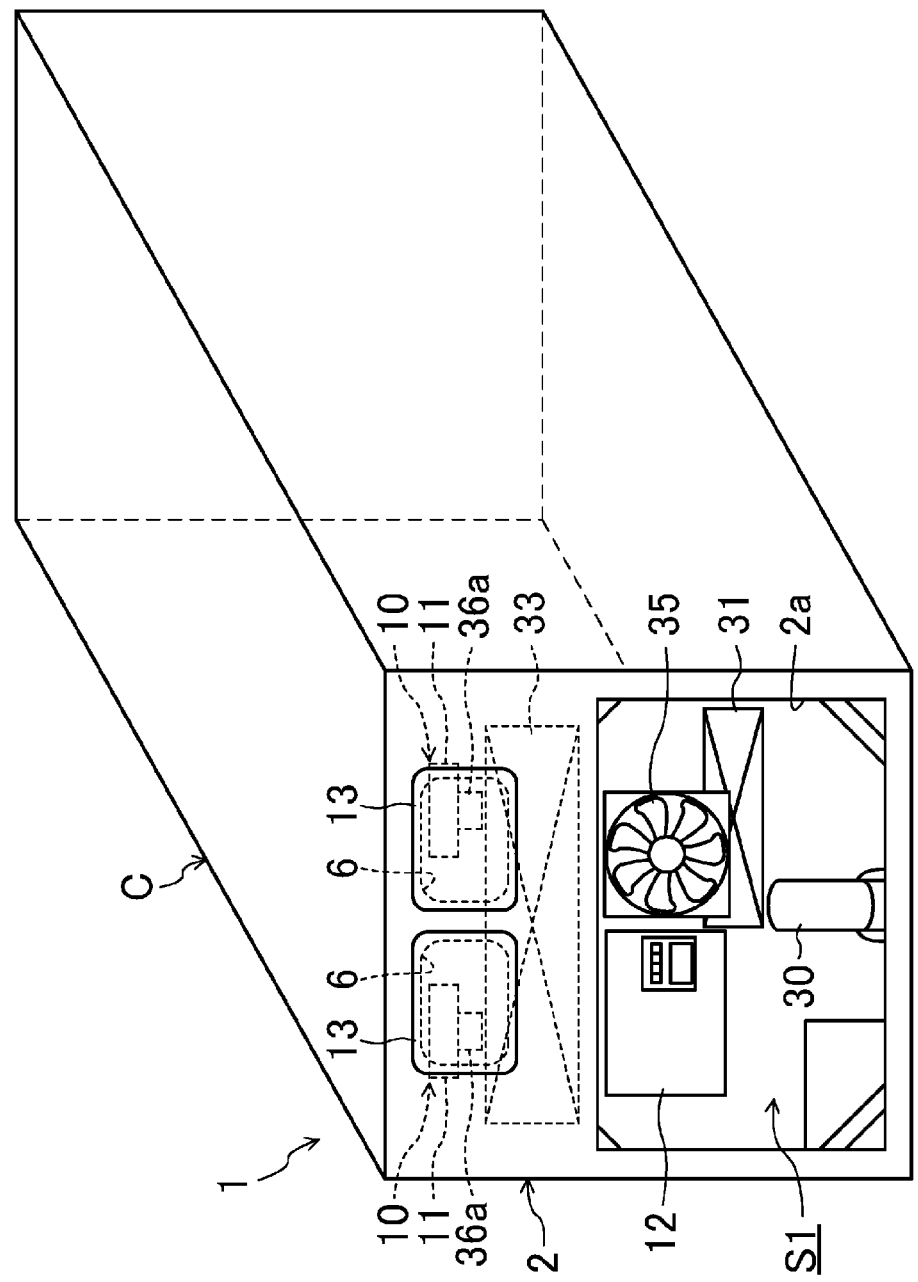
FIG. 1 is a perspective view of a container refrigeration device according to a first embodiment, as viewed from outside of the container.
Figure 2:
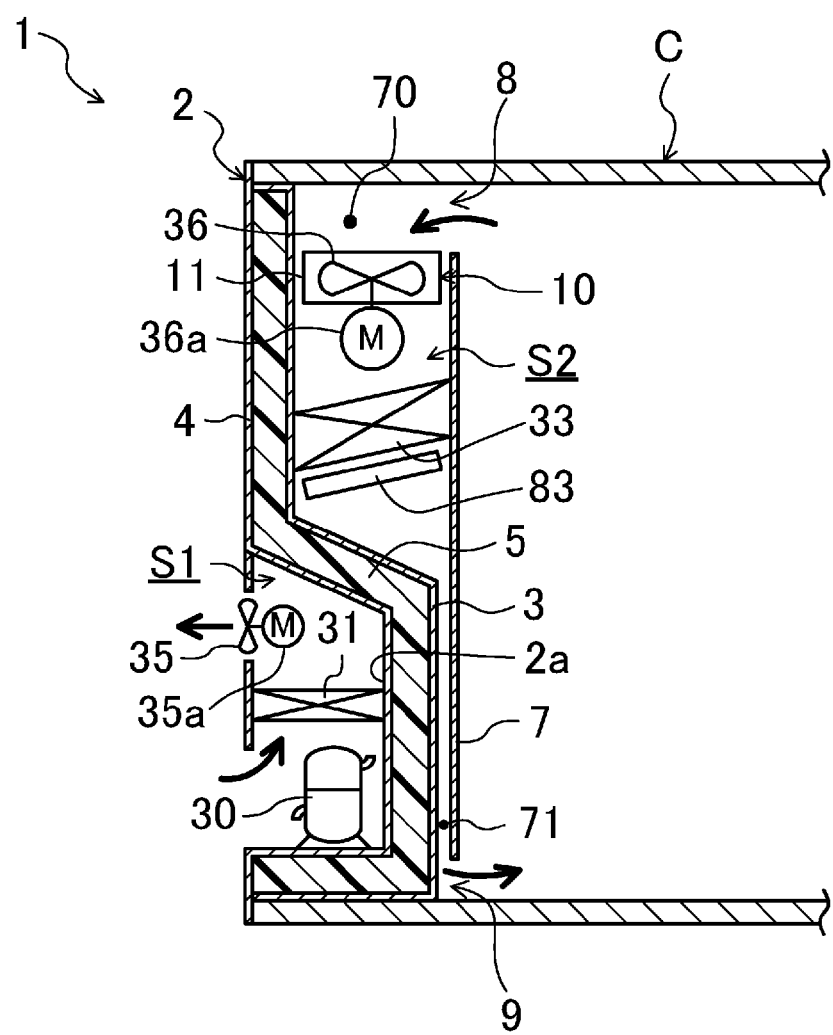
FIG. 2 is a cross-sectional view illustrating a configuration of the container refrigeration device of the first embodiment.
Figure 3:
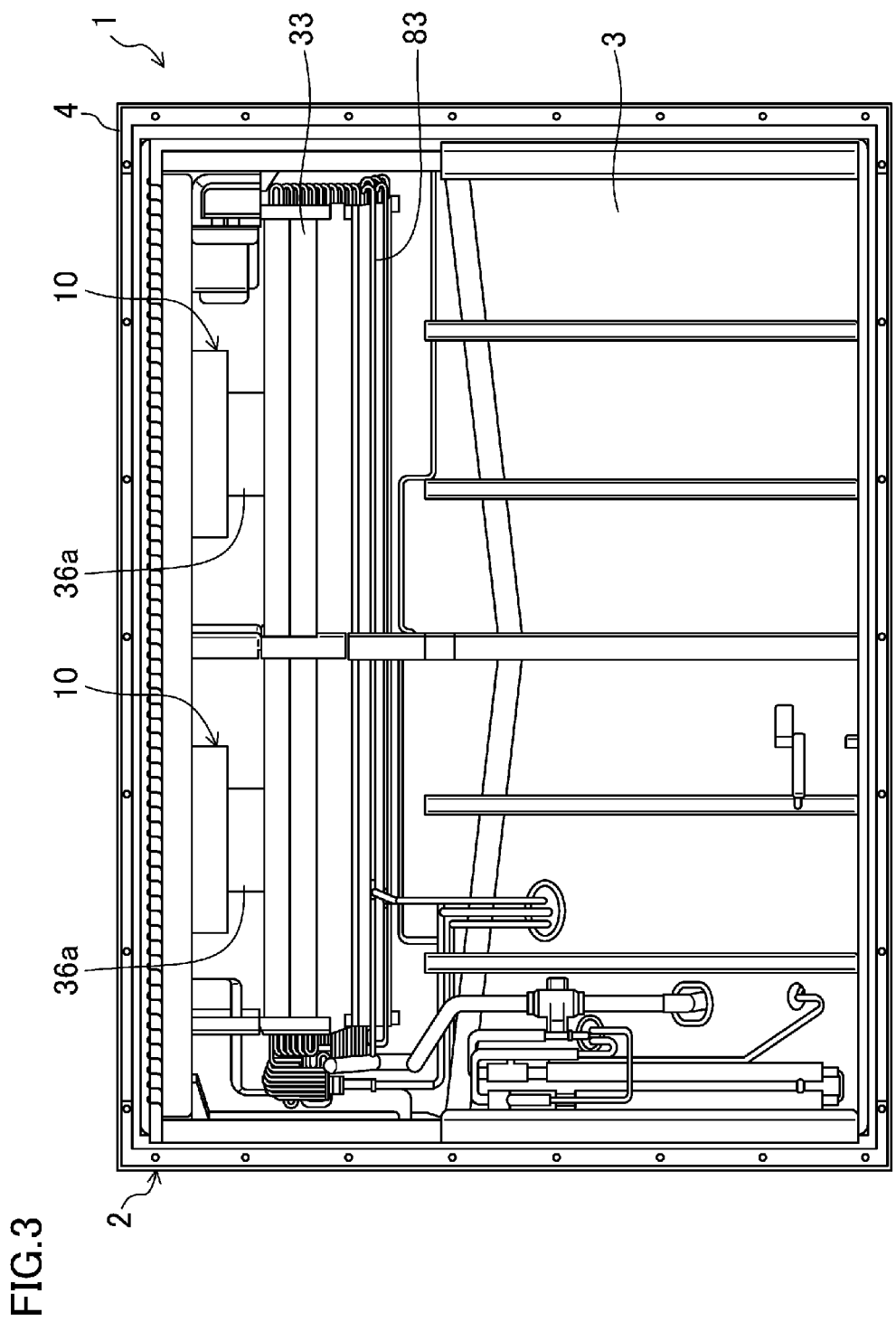
FIG. 3 is a front view of a casing of the first embodiment, as viewed from inside of the container.
Figure 4:
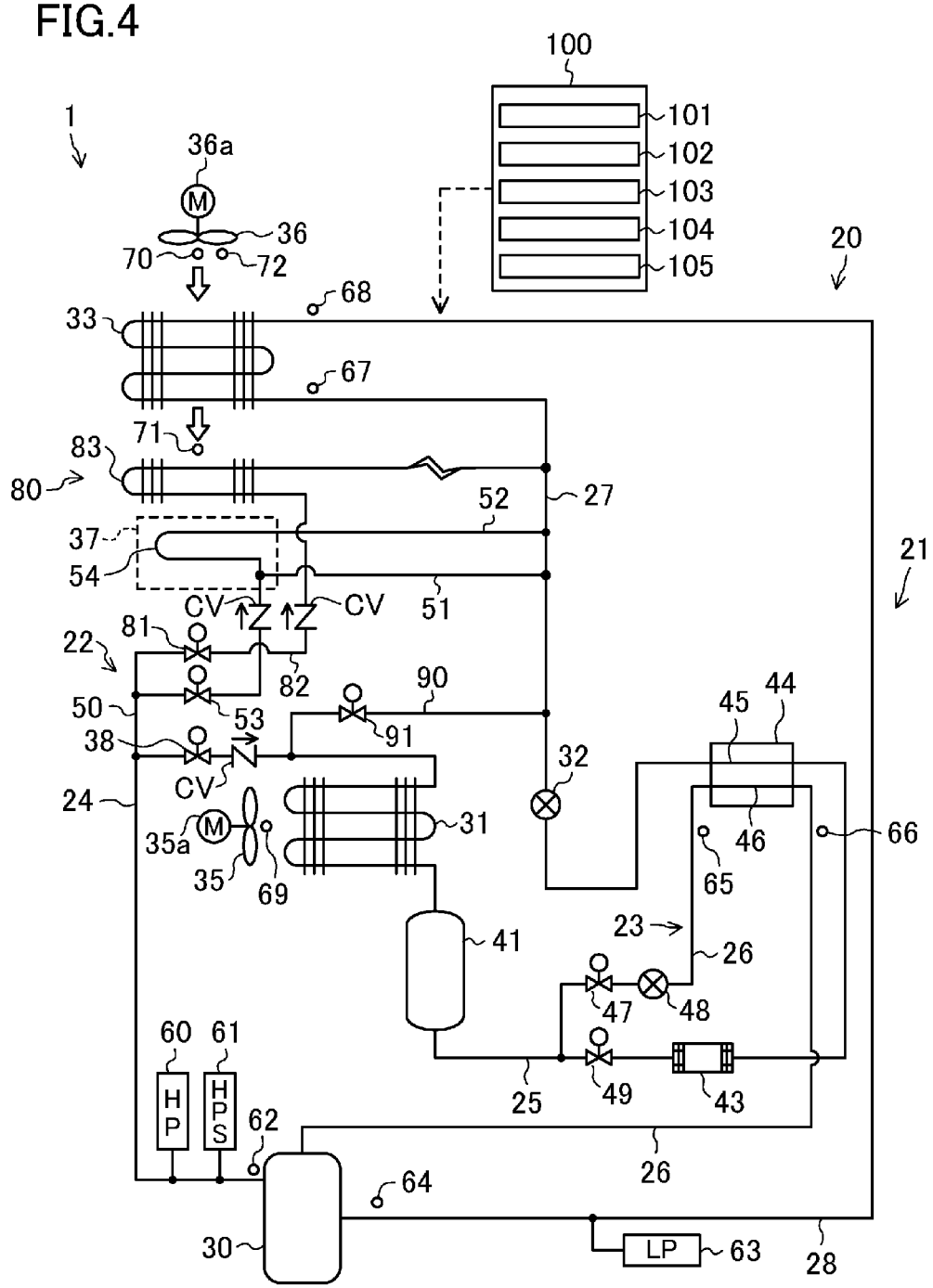
FIG. 4 is a piping system diagram illustrating a refrigerant circuit of the container refrigeration device of the first embodiment.

As illustrated in FIGS. 1-3, a container refrigeration device (1) of the first embodiment is configured to perform refrigeration or freezing in the inside of a container (C) for use in, e.g., marine or land transportation. The container refrigeration device (1) is provided to the box-shaped container (C) having a lateral open end in such a manner that the device closes the open end. The container refrigeration device (1) includes a refrigerant circuit (20), as illustrated in FIG. 4. Thus, the container refrigeration device (1) is configured to cool air inside the container (C) by utilizing a refrigeration cycle performed by the refrigerant circuit (20). Freight (not shown) to be cooled is loaded in the container (C).

—Configuration of Container Refrigeration Device—

As illustrated in FIGS. 1-3, the container refrigeration device (1) includes a casing (2). The peripheral edge portion of the casing (2) is attached to the container (C) to close the open end of the container (C).

As illustrated in FIG. 2, the casing (2) includes an outer casing (4) located toward the outside of the container (C) and an inner casing (3) located toward the inside of the container (C). The outer casing (4) and the inner casing (3) are made of an aluminum alloy.

The outer casing (4) is attached to the peripheral edge portion of the opening of the container (C) to close the open end. The outer casing (4) is in such a shape that a lower portion of the outer casing (4) protrudes toward the inside of the container (C).

The inner casing (3) faces the outer casing (4). A portion of the inner casing (3) corresponding to the lower portion of the outer casing (4) protrudes toward the inside of the container. An insulation material (5) is provided in the space between the outer casing (4) and the inner casing (3). As illustrated in FIG. 1, two openings (6) are located side by side in the width direction and near the upper edge of the casing (2). Each of the openings (6) is provided with a door (13) which can be opened or closed when maintenance is performed. The casing (2) has an outer storage space (S1), where an electric component box (12) is provided adjacent to an outer fan (35).

A lower portion of the casing (2) is shaped to protrude toward the inside of the container (C), thereby forming a recess (2*a*) in a portion of the lower portion of the casing (2) toward the outside of the container (C). The outer storage space (S1) is located in the portion of the lower portion of the casing (2) toward the outside of the container (C) whereas an inner storage space (S2) is located in a portion of an upper portion of the casing (2) toward the inside of the container (C).

A partition plate (7) is provided near a side of the casing (2) facing the inside of the container (C). The partition plate (7) which is a substantially rectangular plate is positioned upright and faces a surface of the casing (2) toward the inside of the container (C). The partition plate (7) separates the inner storage space (S2) from the inside of the container (C). A gap is provided between the upper edge of the partition plate (7) and the ceiling of the container (C). This gap forms an air inlet (8) through which inside air of the container (C) is sucked into the inner storage space (S2). Another gap is provided between the lower edge of the partition plate (7) and the inner bottom surface of the container (C). This gap forms an air outlet (9) through which air treated by the container refrigeration device (1) (i.e., inside air having been cooled) is blown out to the inside of the container (C).

In the outer storage space (S1), a compressor (30), a condenser (31), the outer fan (35), and an outer fan motor (35a) are provided. The compressor (30) and the condenser (31) are connected to the refrigerant circuit (20).

The outer fan motor (35a) rotates the outer fan (35), thereby introduce air outside the container (C) (i.e., outside air) into the outer storage space (S1) and sends the air to the condenser (31). In the condenser (31), a refrigerant flowing through the condenser (31) exchanges heat with the outside air.

In an upper portion of the inner storage space (S2), an evaporator (33), two blower units (10, 10), a suction air temperature sensor (70), and a reheat heat exchanger (83) are provided. In a lower portion of the inner storage space (S2), a blown air temperature sensor (71) is provided. Specifically, the suction air temperature sensor (70) is positioned in a portion of the inner storage space (S2) located uppermost and near to the air inlet (8). Each blower unit (10) is located immediately below the suction air temperature sensor (70). The evaporator (33) is located immediately below the blower units (10). The reheat heat exchanger (83) is located immediately below the evaporator (33). The blown air temperature sensor (71) is positioned in a portion of the inner storage space (S2) located lowermost and nearest to the air outlet (9).

Each blower unit (10) is configured to suck inside air of the container (C) and to blow the air toward the evaporator (33). The two blower units (10, 10) are located side by side in the width direction of the casing (2) in the upper portion of the inner storage space (S2). Each blower unit (10) includes a fan housing (11), an inner fan (36), and an inner fan motor (36a). The inner fan motor (36a) rotates the inner fan (36), thereby introducing the inside air of the container (C) through the air inlet (8) and blowing the air toward the evaporator (33). In the evaporator (33), the refrigerant flowing through the evaporator (33) exchanges heat with the air sucked through the air inlet (8). The inside air having flowed out of the evaporator (33) passes through the reheat heat exchanger (83), and is blown into the inside of the container (C) through the air outlet (9).

The suction air temperature sensor (70) is configured to detect the temperature of air being sucked from the inside of the container (C) into the inner storage space (S2) (i.e., the inside air of the container). The suction air temperature sensor (70) is located between and above the two blower units (10, 10). A detection signal of the suction air temperature sensor (70) is sent to a controller (100) which will be described later.

The evaporator (33) is configured to cool the inside air of the container (C) having been sucked into the inner storage space (S2) by causing the inside air to exchange heat with the refrigerant. The evaporator (33) is connected to the refrigerant circuit (20), and configured to allow the refrigerant to flow therein. The refrigerant flowing through the evaporator (33) absorbs heat from the inside air of the container (C) sucked into the inner storage space (S2) and evaporates. The inside air of the container (C) sucked into the inner storage space (S2) dissipates heat and is cooled when passing through the evaporator (33). In particular, during dehumidifying operation, the evaporator (33) cools the inside air to cause moisture contained in the inside air to condense, and thereby dehumidifies the inside air (cooling dehumidification).

The reheat heat exchanger (83) is a heat exchanger which is used during the dehumidifying operation. Specifically, the reheat heat exchanger (83) is connected to the refrigerant circuit (20), and configured to heat the air subjected to the cooling dehumidification in the evaporator (33). During the dehumidifying operation of the container refrigeration device (1), discharged refrigerant having been compressed in the compressor (30) is directly supplied to the reheat heat exchanger (83). The air subjected to the cooling dehumidification in the evaporator (33) flows into the reheat heat exchanger (83). The air exchanges heat with the discharged refrigerant in the reheat heat exchanger (83). Thus, the air subjected to the cooling dehumidification in the evaporator (33) is heated.

The blown air temperature sensor (71) is configured to detect the temperature of air being blown from the inner storage space (S2) into the inside of the container (C). The blown air temperature sensor (71) is located in the lower portion of the inner storage space (S2). Specifically, the blown air temperature sensor (71) is located at a height between the protruding portion of the inner casing (3) and the partition plate (7) as well as substantially at the midpoint of the inside of the container (C) in the width direction.

—Configuration of Refrigerant Circuit—

As illustrated in FIG. 4, the refrigerant circuit (20) includes a main circuit (21), a hot gas bypass circuit (22), a reheat circuit (80), a subcooling circuit (23), and the controller (100).

The main circuit (21) includes the compressor (30), the condenser (31), a main expansion valve (32), and the evaporator (33) which are sequentially connected together via refrigerant pipes.

The compressor (30) has a motor (not shown) configured to drive a compression mechanism. The revolution speed of the motor of the compressor (30) is controlled in a stepwise manner by an inverter. Thus, the revolution speed N of the compressor (30) is variable.

Each of the condenser (31) and the evaporator (33) is a fin-and-tube heat exchanger. The condenser (31) is located in a portion of the casing (2) toward the outside of the container. In the condenser (31), the outside air exchanges heat with the refrigerant. The evaporator (33) is located in a portion of the casing (2) toward the inside of the container. In the evaporator (33), the inside air exchanges heat with the refrigerant. Further, a drain pan (37) is provided below the evaporator (33). The drain pan (37) is a flat container upwardly opening. The drain pan (37) collects therein frost and ice blocks having fallen from the evaporator (33), water condensed from air, etc. The opening degree of the main expansion valve (32) can be adjusted in a stepwise manner by a pulse motor. The main expansion valve (32) corresponds to the main EV shown in FIGS. 5 and 6. The outer fan (35) is located near the condenser (31) whereas the inner fan (36) is located near the evaporator (33). The inner fan (36) is configured to supply air cooled by the evaporator (33) to the inside of the container. The outer fan (35) and the inner fan (36) are provided with the outer fan motor (35a) and the inner fan motor (36a), respectively.

A fourth on-off valve (38) and a check valve (CV) are sequentially provided on a high-pressure gas pipe (24) located between the compressor (30) and the condenser (31). The opening degree of the fourth on-off valve (38) can be adjusted in a stepwise manner by a pulse motor. The fourth on-off valve (38) corresponds to the DMV shown in FIGS. 5 and 6. The check valve (CV) allows the refrigerant to flow in the direction indicated by the corresponding one of the arrows shown in FIG. 4, and prevents the refrigerant from flowing in the opposite direction.

A receiver (41), a second on-off valve (49), a dryer (43), and a subcooling heat exchanger (44) are sequentially provided on a high-pressure liquid pipe (25) located between the condenser (31) and the main expansion valve (32). The receiver (41) is located downstream of the flow of the refrigerant from the condenser (31), and configured to allow the refrigerant having flowed out of the condenser (31) to flow therein and separate the refrigerant into a saturated liquid and a saturated gas. The second on-off valve (49) is a solenoid valve which can be freely opened and closed. The dryer (43) is configured to capture moisture contained in the liquid refrigerant having flowed through the condenser (31). A liquid cogging prevention pipe (90) connects an upstream point of the condenser (31) to a downstream point of the main expansion valve (32). The liquid clogging prevention pipe (90) is provided with a liquid clogging on-off valve (91).

The subcooling heat exchanger (44) is configured to cool the liquid refrigerant having flowed through the condenser (31). The subcooling heat exchanger (44) includes a primary passage (45) and a secondary passage (46). Specifically, in the subcooling heat exchanger (44), the refrigerant flowing through the primary passage (45) exchanges heat with the refrigerant flowing through the secondary passage (46). The primary passage (45) is connected to the high-pressure liquid pipe (25) of the main circuit (21), and the secondary passage (46) is connected to a subcooling branch pipe (26) of the subcooling circuit (23). An inflow end of the subcooling branch pipe (26) is connected to a point of the high-pressure liquid pipe (25) between the receiver (41) and the second on-off valve (49). An outflow end of the subcooling branch pipe (26) is connected to a compression chamber (an intermediate pressure compression chamber) of the compressor (30) in which the refrigerant is being compressed (in an intermediate pressure state). In other words, the subcooling branch pipe (26) serves as a passage into which part of the liquid refrigerant in the high-pressure liquid pipe (25) is diverted to flow into the intermediate pressure compression chamber of the compressor (30). A first on-off valve (47) and a subcooling expansion valve (48) are provided on an inflow side of the secondary passage (46) of the subcooling branch pipe (26). The first on-off valve (47) is a solenoid valve which can be freely opened and closed. The subcooling expansion valve (48) of which the opening degree can be adjusted in a stepwise manner by a pulse motor forms a decompression mechanism for decompressing the refrigerant. The subcooling expansion valve (48) corresponds to the intermediate EV shown in FIGS. 5 and 6.

The hot gas bypass circuit (22) includes a main passage (50), and two branch passages (51, 52) branching off the main passage (50). The two branch passages (51, 52) are a first branch passage (51) and a second branch passage (52). An inflow end of the main passage (50) is connected to a point of the high-pressure gas pipe (24) between the fourth on-off valve (38) and the discharge side of the compressor (30). The main passage (50) is provided with a third on-off valve (53) and a check valve (CV). The third on-off valve (53) is a solenoid valve which can be freely opened and closed.

The first branch passage (51) has an end connected to an outflow end of the main passage (50) and the other end connected a low-pressure liquid pipe (27) located between the main expansion valve (32) and the evaporator (33). Likewise, the second branch passage (52) has an end connected to the outflow end of the main passage (50) and the other end connected to the low-pressure liquid pipe (27). The second branch passage (52) is a refrigerant pipe longer than the first branch passage (51). The second branch passage (52) includes a drain pan heater (54) which extends in a serpentine form along the bottom of the drain pan (37). The drain pan heater (54) is configured to heat the inside of the drain pan (37) with the refrigerant. Thus, the hot gas bypass circuit (22) constitutes a bypass circuit for supplying the refrigerant compressed by the compressor (30) (i.e., the high-temperature gaseous refrigerant discharged from the compressor (30)) to the evaporator (33).

The reheat circuit (80) includes a reheat passage (82). An inflow end of the reheat passage (82) is connected to the main passage (50). The reheat passage (82) is provided with a fifth on-off valve (81). The fifth on-off valve (81) is a solenoid valve which can be freely opened and closed. The fifth on-off valve (81) corresponds to the RSV shown in FIGS. 5 and 6. The reheat passage (82) includes the reheat heat exchanger (83) and a capillary tube. The reheat heat exchanger (83) is configured to heat, during the dehumidifying operation, air subjected to the cooling dehumidification in the evaporator (33) by causing the refrigerant discharged from the compressor (30) and having flowed into the reheat heat exchanger (83) to exchange heat with the air. The reheat heat exchanger (83) is a fin-and-tube heat exchanger. The capillary tube is configured to decompress the refrigerant having flowed out of the reheat heat exchanger (83). Thus, the reheat circuit (80) constitutes a circuit for supplying part of the refrigerant compressed by the compressor (30) (i.e., the high-temperature gaseous refrigerant discharged from the compressor (30)) to the reheat heat exchanger (83).

The refrigerant circuit (20) also includes various sensors. Specifically, the high-pressure gas pipe (24) is provided with a high pressure sensor (60), a high pressure switch (61), and a discharge temperature sensor (62). The high pressure sensor (60) detects the pressure of the high-pressure gaseous refrigerant discharged from the compressor (30). The discharge temperature sensor (62) detects a temperature of the high-pressure gaseous refrigerant discharged from the compressor (30). A low-pressure gas pipe (28) located between the evaporator (33) and the compressor (30) is provided with a low pressure sensor (63) and a suction temperature sensor (64). The low pressure sensor (63) detects the pressure of the low-pressure gaseous refrigerant being sucked into the compressor (30). The suction temperature sensor (64) detects the temperature of the low-pressure gaseous refrigerant being sucked into the compressor (30).

The subcooling branch pipe (26) is provided with an inflow temperature sensor (65) on the inflow side of the secondary passage (46) and an outflow temperature sensor (66) on the outflow side of the secondary passage (46). The inflow temperature sensor (65) detects the temperature of the refrigerant immediately before flowing into the secondary passage (46). The outflow temperature sensor (66) detects the temperature of the refrigerant immediately after flowing out of the secondary passage (46).

In the low-pressure liquid pipe (27), an inflow temperature sensor (67) is provided on the inflow side of the evaporator (33). The inflow temperature sensor (67) detects the temperature of the refrigerant immediately before flowing into the evaporator (33). In the low-pressure gas pipe (28), an outflow temperature sensor (68) is provided on the outflow side of the evaporator (33). The outflow temperature sensor (68) detects the temperature of the refrigerant immediately after flowing out of the evaporator (33).

Outside the container, an outside air temperature sensor (69) is provided on the suction side of the condenser (31). The outside air temperature sensor (69) detects the temperature of outside air immediately before being sucked into the condenser (31) (hereinafter referred to as the outside air temperature (Tout)). In the container, the suction air temperature sensor (70) and a humidity sensor (72) are provided on the suction side of the evaporator (33), and the blown air temperature sensor (71) is provided on the blowing-out side of the evaporator (33). The suction air temperature sensor (70) detects the temperature of the inside air immediately before entering the evaporator (33) (hereinafter referred to as the suction air temperature (Trs)). The humidity sensor (72) detects the humidity of the inside air immediately before entering the evaporator (33). The blown air temperature sensor (71) detects a temperature of the inside air of the container (C) immediately after passing through the evaporator (33) (hereinafter referred to as the blown air temperature (Tss)). In this embodiment, a humidity refers to a relative humidity.

The controller (100) includes a temperature controlling section (101), a control switching section (103), a temperature setting section (104), a dehumidification determining section (105), and a dehumidification controlling section (102). The controller (100) is connected to the foregoing sensors, and receives signals from the sensors.

The temperature controlling section (101) is configured to perform control during cooling operation or the dehumidifying operation such that the temperature inside the container (C) becomes equal to a predetermined target temperature. The control switching section (103) causes the temperature controlling section (101) to perform first temperature control and second temperature control in a switchable manner.

During the cooling or dehumidifying operation, under the first temperature control, temperature control is performed such that the blown air temperature (Tss) becomes equal to a first target temperature (Tsp). Specifically, under the first temperature control, the revolution speed N of the compressor (30) and/or the opening degree of the main expansion valve (32) are controlled to cause the blown air temperature (Tss) to approach the first target temperature (Tsp). More specifically, under the first temperature control, when the blown air temperature (Tss) is lower than the first target temperature (Tsp), the amount of the refrigerant circulating through the refrigerant circuit (20) is reduced by reducing the revolution speed N of the compressor (30) and/or the opening degree of the main expansion valve (32), thereby mildly cooling the inside air to cause the blown air temperature (Tss) to approach the first target temperature (Tsp). On the other hand, under the first temperature control, when the blown air temperature (Tss) is higher than the first target temperature (Tsp), the amount of the refrigerant circulating through the refrigerant circuit (20) is increased by increasing the revolution speed N of the compressor (30) and/or the opening degree of the main expansion valve (32), thereby further cooling the inside air to cause the blown air temperature (Tss) to approach the first target temperature (Tsp).

During the dehumidifying operation, under the second temperature control, temperature control is performed such that the suction air temperature (Trs) becomes equal to a second target temperature (Tsp') set by the temperature controlling section (104), which will be detailed later. Specifically, under the second temperature control, the revolution speed N of the compressor (30) and/or the opening degree of the main expansion valve (32) are controlled to cause the suction air temperature (Trs) to approach the second target temperature (Tsp'). More specifically, under the second temperature control, when the suction air temperature (Trs) is lower than the second target temperature (Tsp'), the amount of the refrigerant circulating through the refrigerant circuit (20) is reduced by reducing the revolution speed N of the compressor (30) and/or the opening degree of the main expansion valve (32), thereby mildly cooling the inside air to cause the suction air temperature (Trs) to approach the second target temperature (Tsp'). On the other hand, under the second temperature control, when the suction air temperature (Trs) is higher than the second target temperature (Tsp'), the amount of the refrigerant circulating through the refrigerant circuit (20) is increased by increasing the revolution speed N of the compressor (30) and/or the opening degree of the main expansion valve (32), thereby further cooling the inside air to cause the suction air temperature (Trs) to approach the second target temperature (Tsp').

Figure 7:
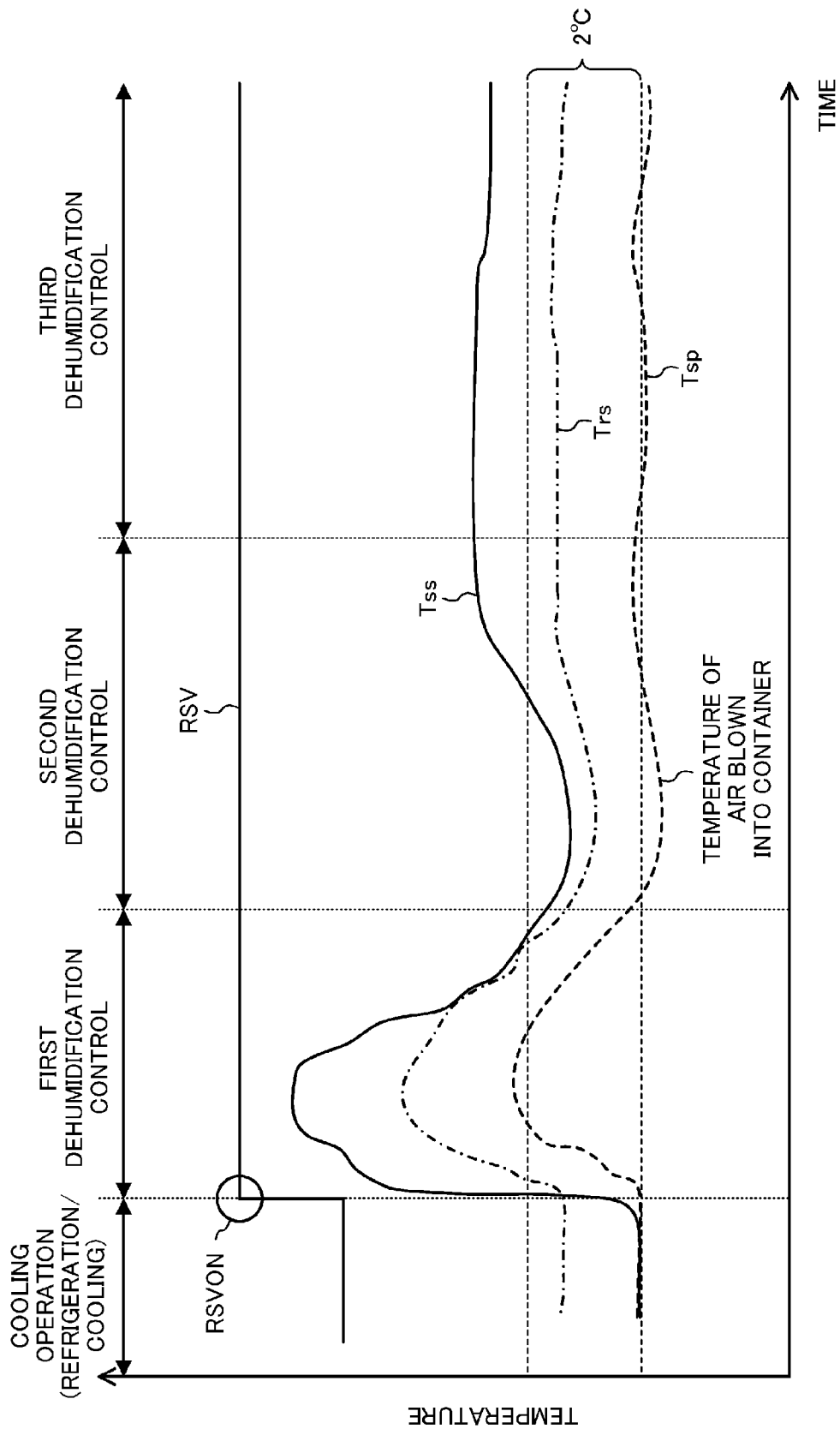
FIG. 7 is a graph illustrating a relation between time and temperature inside the container of the first embodiment.

The control switching section (103) is configured to perform switching from the first temperature control to the second temperature control when the blown air temperature (Tss) becomes higher than the suction air temperature (Trs) during the dehumidifying operation. During the dehumidifying operation, when air subjected to the cooling dehumidification in the evaporator (33) is heated by the reheat heat exchanger (83), the air blown into the inside of the container (C) may become non-uniform in temperature in the width direction of the container (C). This may result in that, as shown in FIG. 7, the blown air temperature (Tss) detected by the blown air temperature sensor (71) may be higher than the suction air temperature (Trs), depending on the location at which the blown air temperature sensor (71) is mounted. That is, it is possible that the blown air temperature sensor (71) detects (erroneously detects) the temperature of the blown air which has been locally increased due to influence of the reheat heat exchanger (83). On the other hand, the air being sucked from the inside of the container (C) into the evaporator (33) has been sufficiently agitated in the container (C), and consequently, temperature non-uniformity of the air is relatively lower than that of the blown air. Thus, it is less possible that a suction air temperature (Trs) which is locally high is detected. Therefore, during the dehumidifying operation, when the blown air temperature (Tss) becomes higher than the suction air temperature (Trs), the control switching section (103) switches the inside temperature control of the container (C) that the temperature control section (101) performs from the first temperature control to the second temperature control.

The temperature setting section (104) is configured to set a temperature in the container (C) under the second temperature control. Specifically, when the control switching section (103) switches the inside temperature control of the container (C) from the first temperature control to the second temperature control, the temperature setting section (104) sets a second target temperature (Tsp') by adding a fixed value of 2° C. as a correction value X to the first target temperature (Tsp) that is the target temperature in the inside of the container (C) under the first temperature control. Under the second temperature control, causing the suction air temperature (Trs) to approach the first target temperature (Tsp) may result in that the temperature inside the container (C) decreases excessively and low temperature damage occurs to the freight because the suction air temperature (Trs) is higher than the temperature inside the container (C) (i.e., the average temperature of the air blown into the container (C)). Therefore, under the second temperature control, the temperature setting section (104) sets the second target temperature (Tsp') by adding the fixed value of 2° C. as the correction value X to the first target temperature (Tsp) of the container (C). It is thus possible to prevent the temperature inside the container (C) from decreasing excessively and low temperature damage from occurring to the freight.

The dehumidification determining section (105) is configured to determine whether or not the dehumidifying operation of the inside of the container (C) is to be performed based on the temperature detected by the blown air temperature sensor (71) and the humidity detected by the humidity sensor (72) and a target humidity of the inside of the container (C). The dehumidification determining section (105) determines that the dehumidifying operation is to be performed when the temperature inside the container (C) is equal to or higher than 0° C. and is continuously within a predetermined range around the target temperature (Tsp, Tsp') and the humidity inside the container (C) is higher than the target humidity plus 2%. On the other hand, the dehumidification determining section (105) makes non-dehumidification determination not to perform the dehumidifying operation when the above conditions do not exist.

Figure 5:
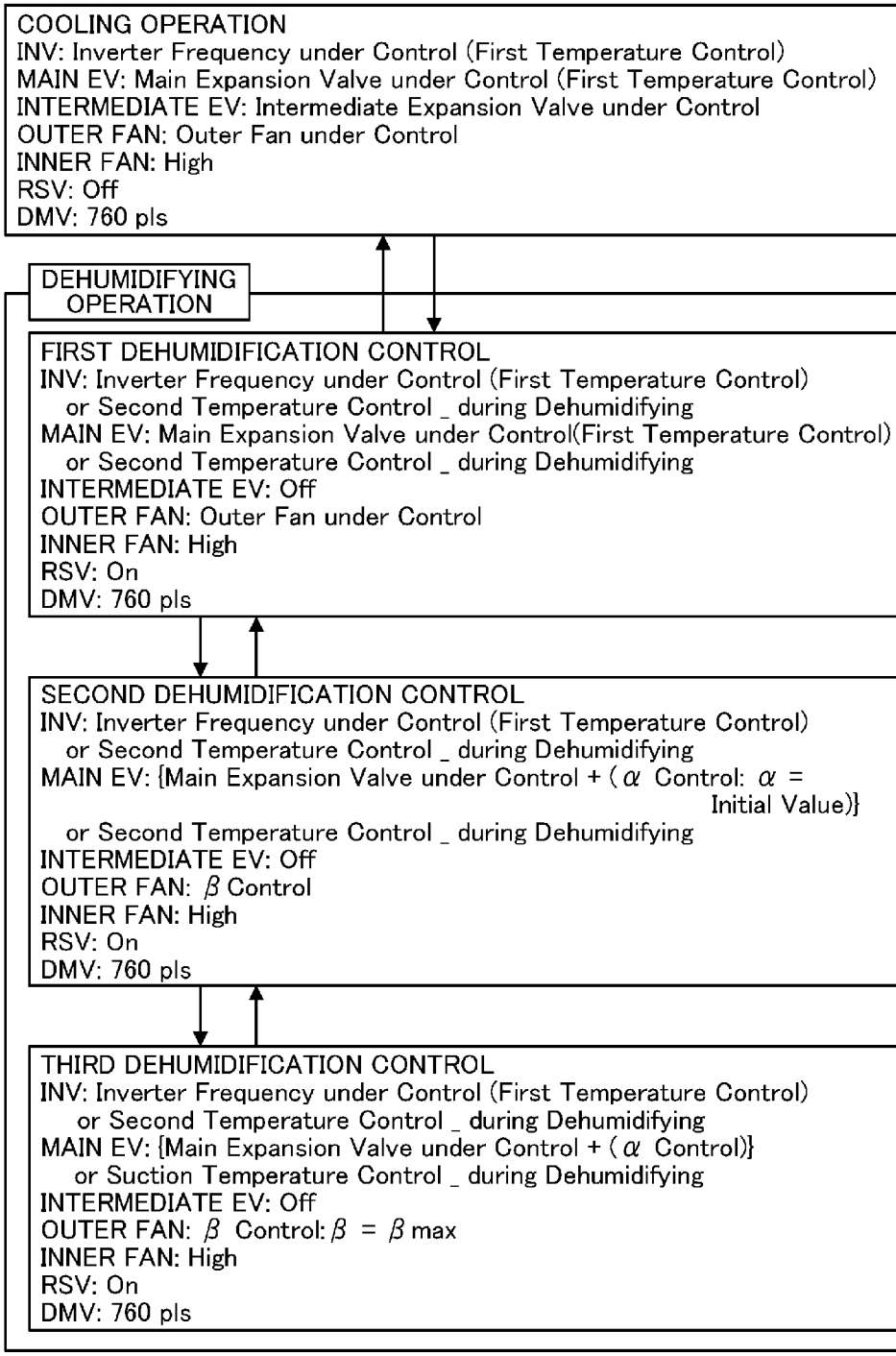
FIG. 5 is a block diagram illustrating control performed during dehumidifying operation according to the first embodiment.

The dehumidification controlling section (102) is configured to control the dehumidifying operation of the inside of the container (C) when the dehumidification determining section (105) determines that the dehumidifying operation is to be performed. As shown in FIGS. 5 and 6, the dehumidification controlling section (102) sequentially performs first to third dehumidification control with increasing dehumidification load (i.e., with increasing difference between the humidity detected by the humidity sensor (72) and the target humidity of the inside of the container (C)).

The first dehumidification control is described first. Under the first dehumidification control, the fifth on-off valve (81) is fully opened and the refrigerant discharged from the compressor (30) is caused to flow into the reheat heat exchanger (83). Under the first dehumidification control, air subjected to the cooling dehumidification in the evaporator (33) exchanges heat with the refrigerant flowing through the reheat heat exchanger (83) when passing through the reheat heat exchanger (83), and consequently the air is heated. Thus, under the first dehumidification control, the air sucked from the inside of the container (C) is subjected to the cooling dehumidification in the evaporator (33), and heated in the reheat heat exchanger (83), thereby maintaining the inside temperature of the container (C) at the target temperature (Tsp, Tsp') while reducing the humidity of the inside air.

The second dehumidification control is performed when the inside of the container (C) remains insufficiently dehumidified after the dehumidification operation under the first dehumidification control has been performed. Under the second dehumidification control, β control by which the pressure of the refrigerant discharged from the compressor (30) and flowing into the reheat heat exchanger (83) (hereinafter referred to as the discharge pressure) becomes higher than the discharge pressure under the first dehumidification control is performed, thereby dehumidifying the inside of the container (C). Specifically, when the dehumidification determining section (105) determines that the dehumidifying operation is to be performed after the first dehumidification control, the discharge pressure of the compressor (30) is controlled according to the switching of the revolution speed of the outer fan (35) under the second dehumidification control. Note that the discharge pressure of the compressor (30) increases with increase of a variable value β (1 to 9) which is preset. In a state where the outer fan (35) is out of operation, since no heat exchange takes place in the condenser (31), the discharge pressure of the compressor (30) increases. When the discharge pressure has increased to reach the limit, the outer fan (35) is rotated. Accordingly, heat exchange takes place in the condenser (31), the discharge pressure of the compressor (30) decreases, and heating performance of the reheat heat exchanger (83) becomes insufficient. The dehumidification controlling section (102) then increases the variable value β in accordance with the dehumidification load, and thereby increases the target value of the discharge pressure of the compressor (30). At this time, since the outer fan (35) is rotating, heat exchange takes place in the condenser (31), and the cooling dehumidification performance of the evaporator (33) increases. Therefore, in order to maintain the temperature inside the container (C), the target value of the discharge pressure of the compressor (30) is set higher than that in a case where the outer fan (35) is out of operation. A resultant increase in the pressure of the refrigerant flowing into the reheat heat exchanger (83) leads to an increase in the heating performance of the reheat heat exchanger (83). Note that the maximum pressure of the refrigerant discharged from the compressor (30) is 2100 kPa. That is, under the second dehumidification control, while the heating performance of the reheat heat exchanger (83) is increased, the cooling dehumidification performance of the evaporator (33) is increased. Consequently, the humidity inside the container (C) can be reduced with the temperature inside the container (C) maintained at the target temperature (Tsp, Tsp').

The third dehumidification control is performed when the inside of the container (C) remains insufficiently dehumidified after the dehumidification operation under the first and second dehumidification control has been performed. Under the third dehumidification control, the inside of the container (C) is dehumidified by increasing a superheat degree α of the evaporator (33). Specifically, when the dehumidification determining section (105) determines that the dehumidifying operation is to be performed after the second dehumidification control, the third dehumidification control is performed in such a manner that the main expansion valve (32) is adjusted with the fifth on-off valve (81) fully opened to increase the superheat degree α of the evaporator (33) from 2° C. sequentially to 5° C., 8° C., 11° C., and 14° C. such that the humidity inside the container (C) approaches the target humidity. Note that the discharge pressure of the compressor (30) is set to the maximum value. Thus, since the suction pressure of the compressor (30) decreases and the specific volume of the refrigerant flowing through the evaporator (33) increases, the amount of the circulating refrigerant decreases. Further, the decrease in the suction pressure of the compressor (30) leads to a decrease in an outlet evaporating temperature of the evaporator (33) and an increase in an amount of moisture condensing in the evaporator (33). This prevents the inside temperature of the container (C) from being maintained at the target temperature (Tsp, Tsp'). Accordingly, the dehumidification controlling section (102) increases the revolution speed N of the compressor (30) to increase the amount of the refrigerant circulating through the refrigerant circuit (20). Thus, the amount of the refrigerant caused to flow into the evaporator (33) increases, and the cooling performance of the evaporator (33) increases. Consequently, the temperature inside the container (C) can be maintained at the target temperature (Tsp, Tsp').

—Operation—

Next, how the container refrigeration device (1) operates is described. The operation of the container refrigeration device (1) is roughly classified into the "cooling operation" and the "dehumidifying operation." The cooling operation is performed to cool the inside of the container (C) to a relatively low temperature. That is, the cooling operation is to cool the inside of the container (C) to refrigerate/cool the freight (e.g., fresh foods) housed in the container so as to preserve the freight. The dehumidifying operation is to reduce the humidity of the inside of the container (C).

<Cooling Operation>

During the cooling operation, "cooling" is implemented. Referring to FIG. 4, in the cooling of the cooling operation, the first on-off valve (47) and the second on-off valve (49) are in an open state, and the third on-off valve (53) and the fifth on-off valve (81) are in a closed state. The fourth on-off valve (38) is in a fully opened state, and the opening degrees of the subcooling expansion valve (48) and the main expansion valve (32) are adjusted appropriately. The compressor (30), the outer fan (35), and the inner fan (36) are in operation.

The refrigerant compressed in the compressor (30) condenses in the condenser (31), and then, passes through the receiver (41). Part of the refrigerant having passed through the receiver (41) continuously flows through the low-pressure liquid pipe (27) and the remainder diverts into the subcooling branch pipe (26). The refrigerant having flowed through the low-pressure liquid pipe (27) is decompressed in the main expansion valve (32), and thereafter, flows through the evaporator (33). In the evaporator (33), the refrigerant absorbs heat from the inside air and evaporates. Thus, the inside air is cooled. The refrigerant having evaporated in the evaporator (33) is sucked into the compressor (30) and compressed again.

The refrigerant having diverted into the subcooling branch pipe (26) passes through the subcooling expansion valve (48), and is decompressed to an intermediate pressure. Thereafter, the refrigerant flows through the secondary passage (46) of the subcooling heat exchanger (44), where the refrigerant flowing through the primary passage (45) exchanges heat with the refrigerant flowing through the secondary passage (46). Consequently, the refrigerant in the primary passage (45) is subcooled whereas the refrigerant in the secondary passage (46) evaporates. The refrigerant having flowed out of the secondary passage (46) is sucked through an intermediate port of the compressor (30) into the compression chamber at an intermediate pressure.

In the cooling, the temperature controlling section (101) controls the revolution speed N of the compressor (30) and the opening degree of the main expansion valve (32) such that the temperature inside the container (C) becomes equal to the first target temperature (Tsp). Specifically, when the blown air temperature (Tss) is lower than the first target temperature (Tsp), the temperature controlling section (101) reduces the revolution speed N of the compressor (30) and the opening degree of the main expansion valve (32). Thus, the amount of the refrigerant circulating through the refrigerant circuit (20) decreases to reduce the cooling performance, thereby causing the blown air temperature (Tss) to approach the first target temperature (Tsp). In this manner, the temperature inside the container (C) is maintained at the first target temperature (Tsp). On the other hand, when the blown air temperature (Tss) is higher than the first target temperature (Tsp), the temperature controlling section (101) increases the revolution speed N of the compressor (30) and the opening degree of the main expansion valve (32). Thus, the amount of the refrigerant circulating through the refrigerant circuit (20) increases to increase the cooling performance, thereby causing the blown air temperature (Tss) to approach the first target temperature (Tsp). In this manner, the temperature inside the container (C) is maintained at the first target temperature (Tsp).

In the cooling, the inner fan (36) is operated in a high state. Regarding the outer fan (35), the revolution speed of the outer fan motor (35a) is controlled in accordance with a state of the refrigerant discharged from the compressor (30).

<Dehumidifying Operation>

Next, the dehumidifying operation of the container refrigeration device (1) is described. The dehumidification controlling section (102) performs the dehumidifying operation based on the determination of the dehumidification determining section (105) that the dehumidifying operation is to be performed. During the dehumidifying operation, the three types of dehumidification control are performed in accordance with the dehumidification load. Further, during the dehumidifying operation, when the blown air temperature (Tss) becomes higher than the suction air temperature (Trs), the control switching section (103) switches the inside temperature control of the container (C) that the temperature controlling section (101) performs from the first temperature control to the second temperature control.

—First Dehumidification Control—

The first dehumidification control is described next. Under the first dehumidification control, as shown in FIGS. 4-6, the dehumidification controlling section (102) operates the compressor (30), the outer fan (35), and the inner fan (36), while bringing the fifth on-off valve (81) into the fully opened state. The first on-off valve (47) and the subcooling expansion valve (48) are in the closed state, and the fourth on-off valve (38) is opened at a degree of 760 pulses. The inner fan (36) is operated to rotate in the high state.

When the first dehumidification control is started, the refrigerant discharged from the compressor (30) passes through the fourth on-off valve (38), the condenser (31), and the main expansion valve (32) to flow into the evaporator (33). When passing through the inside of the evaporator (33), the refrigerant exchanges heat with the inside air sent by the inner fan (36). Consequently, the refrigerant absorbs heat from the inside air and evaporates, and the inside air is thus cooled to a temperature equal to or lower than the target temperature (Tsp, Tsp'), thereby causing moisture contained in the inside air to condense. Thus, the inside air is dehumidified.

Part of the refrigerant discharged from the compressor (30) passes through the fifth on-off valve (81) that is in the fully opened state, and flows into the reheat circuit (80). The discharged refrigerant having entered the reheat circuit (80) passes through the reheat passage (82) to enter the reheat heat exchanger (83). In the reheat heat exchanger (83), the refrigerant exchanges heat with the air subjected to the cooling dehumidification in the evaporator (33). Consequently, in the reheat heat exchanger (83), the refrigerant dissipates heat to the inside air and condenses, and the inside air is thus heated. That is, the air subjected to the cooling dehumidification in the evaporator (33) is heated in the reheat heat exchanger (83), thereby maintaining the inside temperature of the container (C) at the target temperature (Tsp, Tsp').

When the humidity inside the container (C) is still higher than the target humidity plus 2% and the inside temperature of the container (C) is continuously within the predetermined range around the target temperature (Tsp, Tsp') even after the first dehumidification control has been performed, the dehumidification determination section (105) makes determination to perform the dehumidifying operation, and the dehumidification controlling section (102) starts the second dehumidification control.

—Second Dehumidification Control—

Next, the second dehumidification control is descried with reference to FIGS. 4-6. The second dehumidification control is different from the first dehumidification control in that under the second dehumidification control, the outer fan (35) is subjected to the p control to increase the discharge pressure of the compressor (30). Under the second dehumidification control, the superheat degree α of the evaporator (33) is set to the initial value.

Specifically, when the second dehumidification control is started, the dehumidification controlling section (102) controls and sets the superheat degree α of the evaporator (33) to 2° C. The dehumidification controlling section (102) also stops the outer fan (35). When the outer fan (35) is stopped, no heat exchange takes place in the condenser (31), and accordingly, the discharge pressure of the compressor (30) increases. When the discharge pressure reaches the limit, the dehumidification controlling section (102) rotates the outer fan (35). Thus, heat exchange takes place in the condenser (31), the discharge pressure of the compressor (30) decreases, and the heating performance of the reheat heat exchanger (83) becomes insufficient. The dehumidification controlling section (102) then increases the variable value β from 1 to 9 in accordance with the dehumidification load, and thereby increases the target value of the discharge pressure of the compressor (30). Consequently, the pressure of the refrigerant flowing into the reheat heat exchanger (83) increases. This increases in the pressure of the refrigerant in the reheat heat exchanger (83) leads to an increase in the heating performance of the reheat heat exchanger (83). This increase in the heating performance of the reheat heat exchanger (83) leads to an increase in the temperature inside the container (C). Consequently, the dehumidification controlling section (102) increases the revolution speed N of the compressor (30) to increase the amount of the refrigerant circulating through the refrigerant circuit (20), and thereby increases cooling performance of the evaporator (33) and the amount of moisture condensing in the evaporator (33). In this manner, the humidity inside the container can be reduced with the temperature inside the container (C) maintained at the target temperature (Tsp, Tsp').

When the humidity inside the container (C) is still higher than the target humidity plus 2% and the temperature inside the container (C) is continuously within the predetermined range around the target temperature (Tsp, Tsp') even after the second dehumidification control has been performed, the dehumidification determination section (105) makes determination to perform the dehumidifying operation, and the dehumidification controlling section (102) starts the third dehumidification control.

—Third Dehumidification Control—

Next, the third dehumidification control is descried with reference to FIGS. 4-6. The third dehumidification control is different from the second dehumidification control in that under the third dehumidification control, the dehumidification controlling section (102) controls the superheat degree α of the evaporator (33).

Specifically, the dehumidification controlling section (102) adjusts the main expansion valve (32) to increase the superheat degree α of the evaporator (33) from 2° C. sequentially to 5° C., 8° C., 11° C., and 14° C. such that the humidity inside the container (C) approaches the target humidity. This results in that the suction pressure of the compressor (30) decreases and the specific volume of the refrigerant flowing through the evaporator (33) increases, and consequently, the amount of the circulating refrigerant decreases. Further, the decrease in the suction pressure of the compressor (30) leads to a decrease in the outlet evaporating temperature of the evaporator (33) and an increase in the amount of moisture condensing in the evaporator (33). Accordingly, the dehumidification controlling section (102) increases the revolution speed N of the compressor (30) to a value higher than a control value to increase the amount of the refrigerant circulating through the refrigerant circuit (20) and the amount of the refrigerant flowing into the evaporator (33). Consequently, the amount of the refrigerant flowing through the evaporator (33) increases, and the cooling performance of the evaporator (33) increases, and the temperature inside the container (C) is caused to approach the target temperature (Tsp, Tsp'). That is, it is possible to increase the dehumidification performance while maintaining the temperature inside the container (C) within the predetermined range around the target temperature (Tsp, Tsp').

—Switching of Inside Temperature Control—

Next, switching between the first temperature control and the second temperature control of the temperature controlling section (101) during the dehumidification operation is described. During the dehumidification operation, when the blown air temperature (Tss) becomes higher than the suction air temperature (Trs), the control switching section (103) causes the temperature controlling section (101) to switch the control of the temperature inside the container (C), from the first temperature control to the second temperature control.

Next, the temperature setting section (104) sets a target value of the temperature inside the container (C) under the second temperature control to the second target temperature (Tsp') obtained by adding the fixed value of 2° C. to the first target temperature (Tsp).

The temperature controlling section (101) then implements the second temperature control. The temperature controlling section (101) controls the revolution speed N of the compressor (30) and/or the opening degree of the main expansion valve (32) such that the suction air temperature (Trs) approaches the second target temperature (Tsp'). When the suction air temperature (Trs) is lower than the second target temperature (Tsp'), the temperature controlling section (101) reduces the revolution speed N of the compressor (30) and/or the opening degree of the main expansion valve (32) to reduce the amount of the refrigerant circulating through the refrigerant circuit (20), thereby mildly cooling the inside air and causing the suction air temperature (Trs) to approach the second target temperature (Tsp'). On the other hand, when the suction air temperature (Trs) is higher than the second target temperature (Tsp'), the temperature controlling section (101) increases the revolution speed N of the compressor (30) and/or the opening degree of the main expansion valve (32) to increase the amount of the refrigerant circulating through the refrigerant circuit (20), thereby further cooling the inside air and causing the suction air temperature (Trs) to approach the second target temperature (Tsp').

Advantages of First Embodiment

According to the first embodiment described above, when the blown air temperature (Tss) becomes higher than the suction air temperature (Trs) during the dehumidification operation, the control is switched to the second temperature control under which the temperature inside the container (C) is controlled based on the suction air temperature (Trs). Here, during the dehumidification operation, when the blown air temperature becomes higher than the suction air temperature in the container, it is conceivable that the blown air has non-uniformity in temperature due to influence of the reheat heat exchanger. Therefore, if temperature control was performed to cause the blown air temperature to become equal to the target value of the temperature inside of the container, the temperature inside the container could excessively decrease and low temperature damage could occur to the freight. On the other hand, according to the first embodiment, the temperature inside the container (C) is controlled based on the temperature of air which has been sufficiently agitated in the container (C), has relatively low non-uniformity in temperature, and is being sucked into the evaporator (33) (i.e., the suction air temperature (Trs)). It is thus possible to prevent the temperature inside the container (C) from decreasing excessively. As a result, it is possible to prevent reliably low temperature damage from occurring to the freight in the container (C).

In addition, under the second temperature control, the target value of the suction air temperature (Trs) is set to the second target temperature (Tsp') that is higher than the first target temperature (Tsp). Here, the temperature of air being blown into the inside of the container (C) is ordinarily lower than the temperature of air being sucked from the inside of the container (C). Therefore, if the temperature of air being sucked from the inside of the container (C) (i.e., the suction air temperature (Trs)) was controlled based on the target value of the temperature of air being blown into the inside of the container (C) (i.e., the blown air temperature (Tss)), the temperature inside the container (C) could decrease excessively and low temperature damage could occur to the freight. According to the first embodiment, under the second temperature control, the target value of the suction sir temperature (Trs) is set to the second target temperature (Tsp') obtained by adding the correction value X to the first target temperature (Tsp). It is thus possible to prevent reliably the temperature inside the container (C) from decreasing excessively. As a result, it is possible to prevent reliably low temperature damage from occurring to the freight in the container (C).

Further, under the second temperature control, the target value of the suction air temperature (Trs) is set to the second target temperature (Tsp') obtained by adding the fixed value (+2° C.) to the first target temperature (Tsp). It is thus possible to prevent the temperature inside the container (C) from decreasing excessively. As a result, it is possible to prevent reliably low temperature damage from occurring to the freight in the container (C).

Second Embodiment of the Invention

A second embodiment is described next. The second embodiment is different from the first embodiment in the configuration of the temperature setting section (104). In the description of the second embodiment 2, only the difference between the first and second embodiments is described.

The temperature setting section (104) of this embodiment is configured to set a target value of the temperature inside the container (C) to the second target temperature (Tsp') when the blown air temperature (Tss) becomes higher than the suction air temperature (Trs). When the blown air temperature (Tss) becomes higher than the suction air temperature (Trs), the temperature setting section (104) calculates a correction value X for temperature based on the outside air temperature (Tout) and the first target temperature (Tsp).

Figure 8:
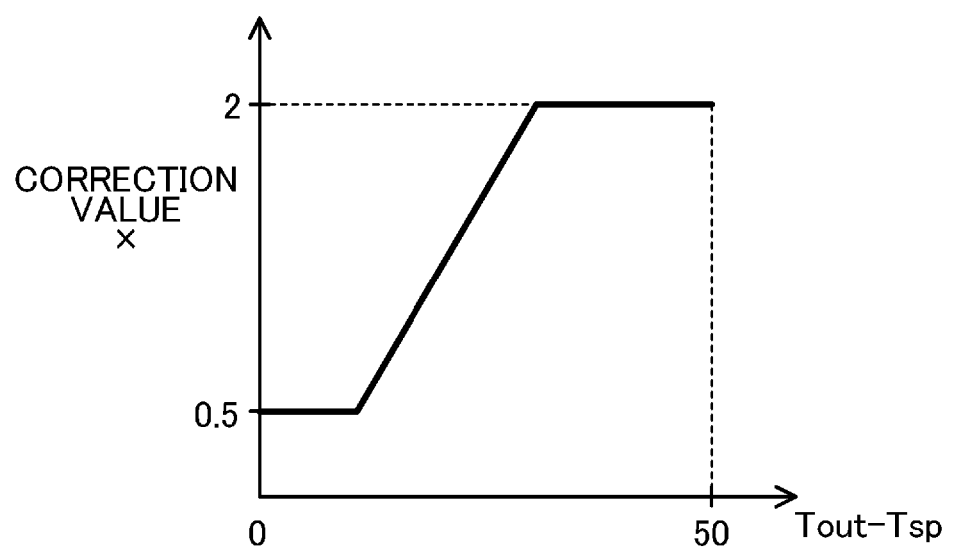
FIG. 8 is a graph illustrating a relation between a difference between an outside air temperature and a first target temperature, and a correction value according to a second embodiment.

Specifically, the correction value X is proportional to the difference between the outside air temperature (Tout) and the first target temperature (Tsp) (see FIG. 8). Therefore, when the difference between the outside air temperature (Tout) and the first target temperature (Tsp) increases, the correction value X increases. The correction value X is set within the temperature range from 0.5 to 2.0.

Here, when the inside of the container (C) has been sufficiently cooled, the suction air temperature (Trs), the blown air temperature (Tss), and the first target temperature (Tsp) are nearly equal to one another. Therefore, the temperature load of the container (C) is represented by the following formula.

(Container Temperature Load)=$u$-Value×(Outside Air Temperature ($T$out)−First Target Temperature ($Tsp$))

Note that the u-value is a coefficient representing heat transfer of the container (C).

Therefore, the temperature difference between the temperature of air being sucked from the inside of the container (C) and the temperature of air being blown into the inside of the container (C) is proportional to the difference existing between the outside air temperature (Tout) and the first target temperature (Tsp) and representing the temperature load applied to the container refrigeration device (1). Since the temperature difference between the air being sucked and the air being blown corresponds to the correction value X, the correction value X can be calculated according to the difference between the outside air (Tout) and the first target temperature (Tsp) (see FIG. 8).

According to the second embodiment descried above, under the second temperature control, the target value of the sucked air temperature (Trs) is set to the second target temperature (Tsp') obtained by adding, to the first target temperature (Tsp), the correction value X calculated based on the outside air temperature (Tout) and the first target temperature (Tsp). It is thus possible to prevent reliably the temperature inside the container (C) from decreasing excessively. As a result, it is possible to prevent reliably low temperature damage from occurring to the freight in the container (C). The other configurations, operation, and advantages of this embodiment are similar to those of the first embodiment.

Third Embodiment of the Invention

A third embodiment is described next. The third embodiment is different from the first embodiment in the configuration of the temperature setting section (104). In the description of the third embodiment, only the difference between the first and third embodiments is described.

The temperature setting section (104) of this embodiment is configured to set a target value of the temperature inside the container (C) to the second target temperature (Tsp') when the blown air temperature (Tss) becomes higher than the suction air temperature (Trs). When the blown air temperature (Tss) becomes higher than the suction air temperature (Trs), the temperature setting section (104) calculates a correction value X for temperature based on the blown air temperature (Trs) detected during the cooling operation and the suction air temperature (Trs) detected after starting of the dehumidification operation.

Specifically, the blown air temperature (Tss) detected during the cooling operation (i.e. the blown air temperature (Tss) before starting of the dehumidification operation) is a temperature detected without being influenced by the reheat heat exchanger (83), and therefore, is a relatively accurate temperature of air being blown. Thus, the difference between the blown air temperature (Tss) detected during the cooling operation and the suction air temperature detected after starting of the dehumidification operation is determined as the correction value X. The correction value X is set within the temperature range from 0.5 to 2.0.

According to the third embodiment above described, under the second temperature control, the target temperature of the suction air temperature (Trs) is set to the second target temperature (Tsp') obtained by adding, to the first target temperature (Tsp), the correction value X calculated based on the difference between the blown air temperature (Tss) detected before starting of the dehumidification operation during which the refrigerant discharged from the compressor (30) is allowed to flow into the reheat heat exchanger (83) and the suction air temperature (Trs) detected after the starting of the dehumidification operation. It is thus possible to prevent reliably the temperature inside the container (C) from decreasing excessively. As a result, it is possible to prevent reliably low temperature damage from occurring to the freight in the container (C). The other configurations, operation, and advantages of this embodiment are similar to those of the first embodiment.

Fourth Embodiment of the Invention

Figure 9:
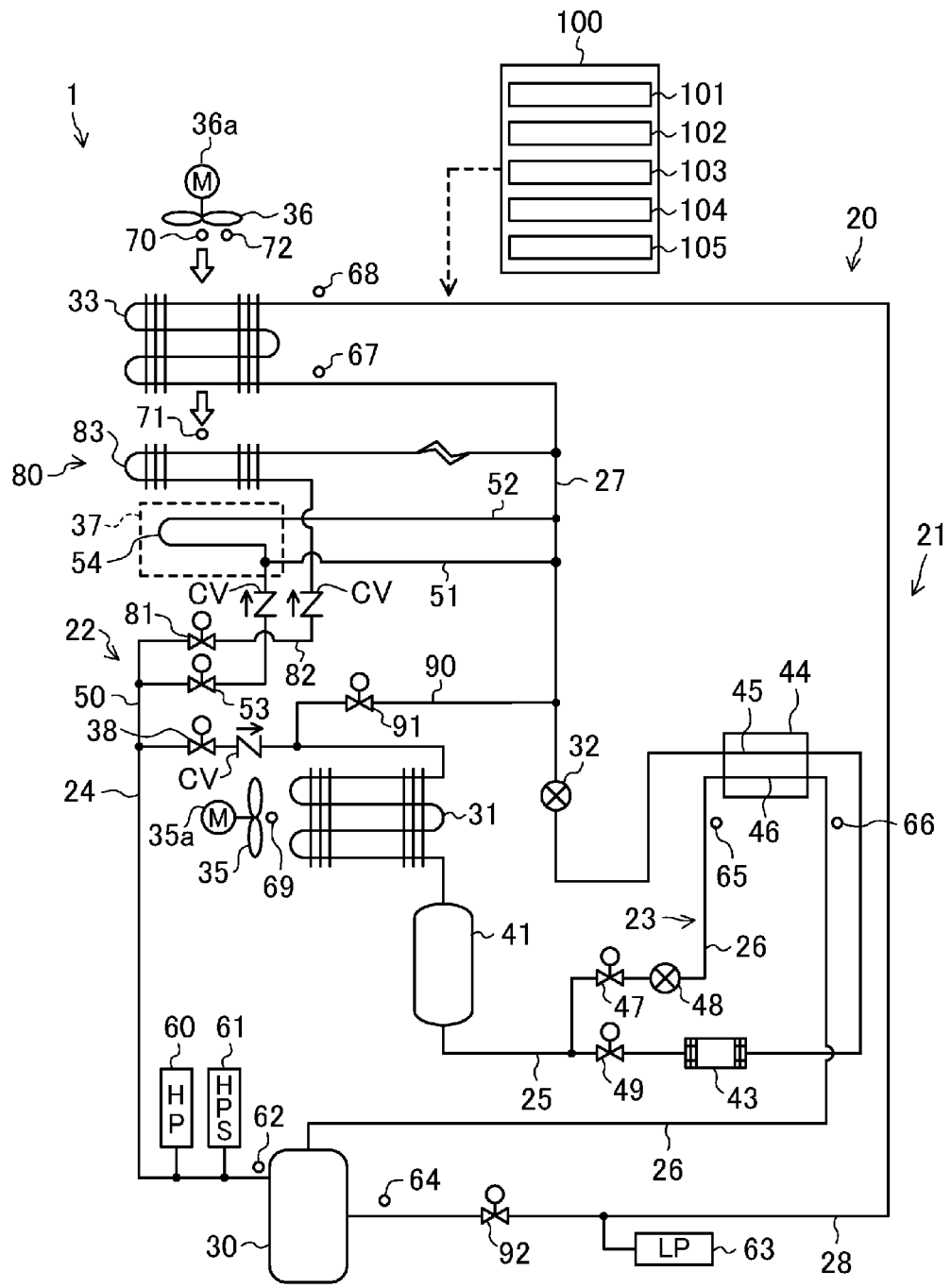
FIG. 9 is a piping system diagram illustrating a refrigerant circuit of a container refrigeration device of a fourth embodiment.

A fourth embodiment is described next. As illustrated in FIG. 9, a container refrigeration device (1) according to the fourth embodiment is different from that of the first embodiment in that the device of the fourth embodiment includes a suction flow regulating valve (92) and a compressor (30) configured differently from that of the first embodiment. In the description of the fourth embodiment, only the differences between the first and fourth embodiments will be described.

Specifically, the compressor (30) of the fourth embodiment whose revolution speed is not variable operates at a fixed revolution speed. The suction flow regulating valve (92) is located in the refrigerant circuit (20), between the compressor (30) and the evaporator (33). The suction flow regulating valve (92) forms a flow regulating valve of the present invention. The temperature controlling section (101) adjusts the opening degree of the suction flow regulating valve (92) to regulate the flow rate of the refrigerant being sucked into the compressor (30).

According to the fourth embodiment, since the suction flow regulating valve (92) configured to regulate the flow rate of the refrigerant being sucked into the compressor (30) is provided, it is possible to regulate the flow rate of the refrigerant discharged from the compressor (30) by opening or closing the suction flow regulating valve (92). Thus, the flow rate of the refrigerant flowing through the evaporator (33) can be regulated. In this manner, the temperature inside the container (C) can be maintained within a predetermined temperature range. The other configurations, operation, and advantages of this embodiment are similar to those of the first embodiment.

OTHER EMBODIMENTS

The first through fourth embodiments of the present invention may be configured as follows.

According to each of the first through fourth embodiments described above, the temperature setting section (104) is configured to set the target value (i.e. the second target temperature (Tsp')) of the temperature inside the container under the second temperature control. The present invention is not limited to this. Under the second temperature control, the target value of the temperature inside the container may be continuously set to the first target temperature (Tsp), and the correction value X may be subtracted from the suction air temperature (Trs) to determine a corrected suction air temperature (Trs').

The foregoing embodiments are merely preferred examples in nature, and are not intended to limit the scope, applications, and use of the present invention.

INDUSTRIAL APPLICABILITY

As described above, the present invention is useful for control of temperature inside a container during dehumidification operation performed by a container refrigeration device.

DESCRIPTION OF REFERENCE CHARACTERS

20 Refrigerant Circuit
30 Compressor
31 Condenser
32 Main Expansion Valve
33 Evaporator
70 Suction Air Temperature Detector
71 Blown Air Temperature Detector
83 Reheat Heat Exchanger
101 Temperature Controlling Section
103 Control Switching Section
104 Temperature Setting Section

The invention claimed is:

1. A container refrigeration device comprising:
a refrigerant circuit including a compressor, a condenser, an expansion valve, and an evaporator sequentially connected together; and
a reheat heat exchanger configured to allow part of a refrigerant discharged from the compressor to directly flow into the reheat heat exchanger, the device being configured to perform dehumidification operation during which air sucked from an inside of a container and subjected to cooling dehumidification in the evaporator exchanges heat with the refrigerant flowing through the reheat heat exchanger, wherein
the device further includes
a suction air temperature detector configured to detect a suction air temperature which is a temperature of air being sucked into the evaporator from the inside of the container,
a blown air temperature detector configured to detect a blown air temperature which is a temperature of air having passed through the reheat heat exchanger and being blown into the inside of the container,
a temperature controlling section configured to perform, during the dehumidification operation, a first temperature control under which a temperature inside the container is controlled in such a manner that at least one of the compressor and the expansion valve is controlled to cause the blown air temperature to approach a predetermined first target temperature, and a second temperature control under which the temperature inside the container is controlled in such a manner that at least one of the compressor and the expansion valve is controlled to cause the suction air temperature to approach a predetermined second target temperature, in a switchable manner, and
a control switching section configured to switch from the first temperature control to the second temperature control when the blown air temperature is higher than the suction air temperature during the dehumidification operation during which the part of the refrigerant discharged from the compressor is allowed to flow into the reheat heat exchanger.

2. The container refrigeration device of claim 1, wherein the device further includes a temperature setting section (104) configured to set the second target temperature to a value obtained by adding a correction value to the first target temperature.

3. The container refrigeration device of claim 2, wherein the temperature setting section is configured to set the correction value to a predetermined fixed value.

4. The container refrigeration device of claim 2, further comprising:
an outside air temperature detector configured to detect an outside air temperature which is a temperature of air outside the container, wherein
the temperature setting section is configured to calculate the correction value based on the outside air temperature and the first target temperature.

5. The container refrigeration device of claim 2, wherein the temperature setting section is configured to calculate the correction value based on a difference between the blown air temperature detected before starting of the dehumidification operation during which the refrigerant discharged from the compressor is allowed to flow into the reheat heat exchanger and the suction air temperature detected after the starting of the dehumidification operation.

* * * * *